Figure 5:
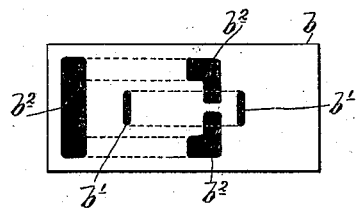

(No Model.) 5 Sheets—Sheet 1.
H. H. VAUGHAN & M. E. McKEE.
ENGINEER'S BRAKE VALVE.
No. 504,290. Patented Aug. 29, 1893.
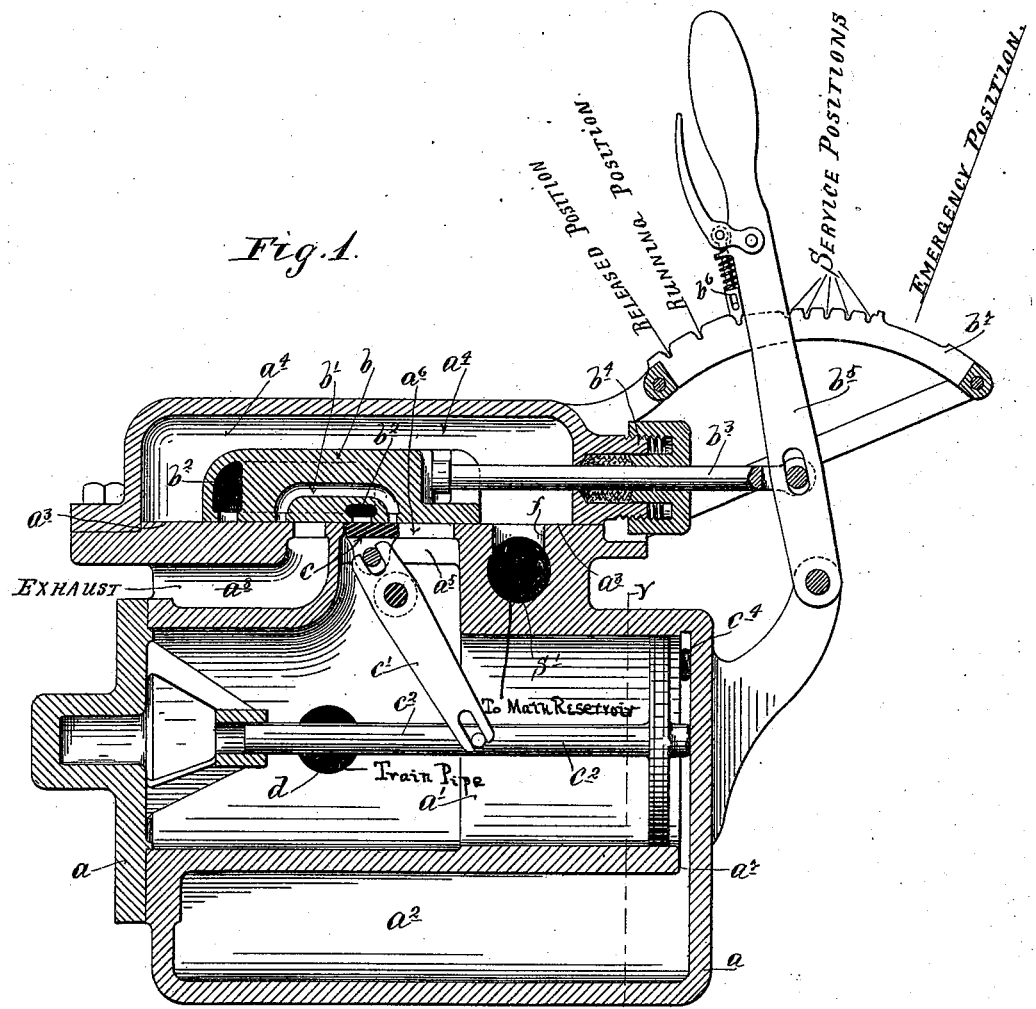
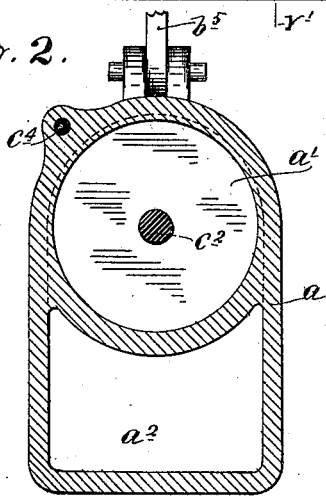

(No Model.) 5 Sheets—Sheet 2.

H. H. VAUGHAN & M. E. McKEE.
ENGINEER'S BRAKE VALVE.

No. 504,290. Patented Aug. 29, 1893.

Witnesses.
E. F. Elmore
Frank D. Merchant

Inventors,
Henry H. Vaughan
Martin E. McKee
By their Attorney.
Jas. F. Williamson (No Model.) 5 Sheets—Sheet 3.
H. H. VAUGHAN & M. E. McKEE.
ENGINEER'S BRAKE VALVE.
No. 504,290. Patented Aug. 29, 1893.
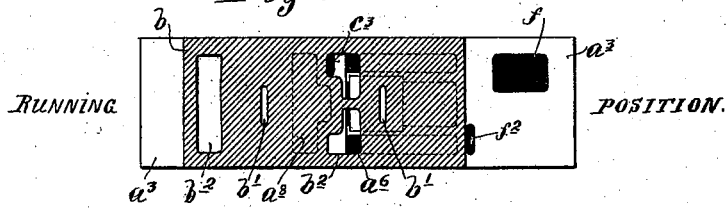
Fig. 6ª — RUNNING POSITION.
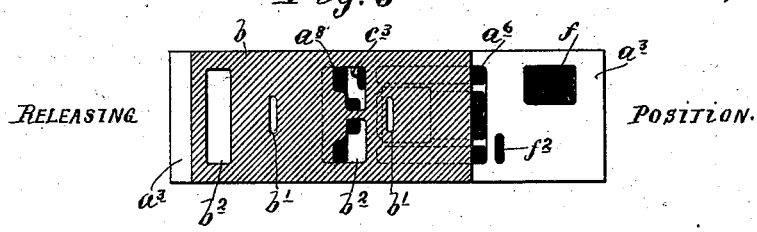
Fig. 6ᵈ — RELEASING POSITION.
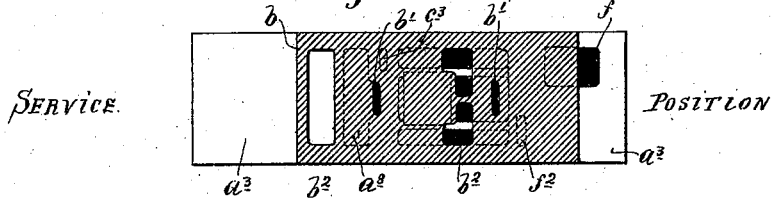
Fig. 6ᵇ — SERVICE POSITION.
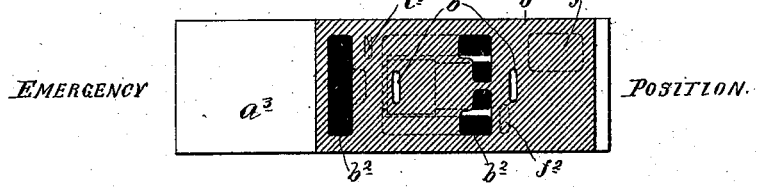
Fig. 6ᶜ — EMERGENCY POSITION.
Witnesses.
E. F. Elmore,
Frank L. Merchant
Inventors.
Henry H. Vaughan
Martin E. McKee
By their Attorney.
Jas. F. Williamson (No Model.)　　　　　　　　　　　　　　　　　　5 Sheets—Sheet 4.
H. H. VAUGHAN & M. E. McKEE.
ENGINEER'S BRAKE VALVE.
No. 504,290.　　　　　　　　　Patented Aug. 29, 1893.

Witnesses.
E. F. Elmore
Frank D. Merchant

Inventors,
Henry H. Vaughan
Martin E. McKee
By their Attorney.
Jas. F. Williamson (No Model.) 5 Sheets—Sheet 5.

H. H. VAUGHAN & M. E. McKEE.
ENGINEER'S BRAKE VALVE.

No. 504,290. Patented Aug. 29, 1893.

Witnesses.
E. F. Elmore
Frank D. Merchant

Inventors.
Henry H. Vaughan
Martin E. McKee
By their Attorney.
Jas. P. Williamson

UNITED STATES PATENT OFFICE.

HENRY H. VAUGHAN AND MARTIN E. McKEE, OF ST. PAUL, MINNESOTA.

ENGINEER'S BRAKE-VALVE.

SPECIFICATION forming part of Letters Patent No. 504,290, dated August 29, 1893.

Application filed March 31, 1893. Serial No. 468,424. (No model.)

*To all whom it may concern:*

Be it known that we, HENRY H. VAUGHAN, a subject of the Queen of Great Britain, and MARTIN E. McKEE, a citizen of the United States, residing at St. Paul, in the county of Ramsey and State of Minnesota, have invented certain new and useful Improvements in Engineers' Brake-Valves; and we do hereby declare the following to be a full, clear, and exact description of the invention, such as will enable others skilled in the art to which it appertains to make and use the same.

Our invention relates to fluid pressure railway brakes; and has for its object to provide an improved engineer's brake valve.

The especial purposes had in view, as well as the exact nature of our invention, will appear from the statements of fact and the detailed description of mechanism hereinafter given; and the novel features of the construction will be defined in the claims.

While capable of a more general application, our invention is especially designed for use in automatic air brake systems of well known standard types, such as the Westinghouse, New York, &c.

The construction of the type of air-brakes above referred to and the principles of their operation are well known. It is desirable, however, to call to mind several of the salient features of the said systems, in order to distinctly bring out the purposes and construction of our improved engineer's valve. As is well-known, the auxiliary reservoirs are normally in communication with the train-pipe and both are, of course, charged with the same pressure, which is ordinarily seventy pounds. The charge is given from the main reservoir on the engine through a reduction valve, which is ordinarily set to give a reduction of twenty pounds. In other words, the main reservoir is ordinarily charged to ninety pounds by the pump, under the control of a governor valve, normally in communication with the train-pipe, which automatically stops the pump whenever the maximum train pipe pressure of seventy pounds is reached. The brakes are applied throughout the train, by a reduction of pressure in the train pipe, which reduction causes the triple valves to first shut off the auxiliary reservoirs from the train pipe and then to open the said reservoirs to the brake motors, thereby setting the brakes. The proportions of the brake motor cylinders and the auxiliary reservoirs are such that when the brakes are set to maximum pressure in so called service application, the equalizing action between the two, under expansion, will reduce the original pressure of the auxiliary reservoir to fifty pounds, or give a twenty pound reduction. Hence the maximum effective reduction in the train-pipe for braking purposes, is twenty pounds. Any further reduction simply bleeds the train pipe. Within the range of twenty pounds, the power with which the brakes will be applied is dependent on the amount of reduction in the train pipe.

The above remarks apply especially to service applications of the brakes, where the reduction should be gradual.

The so-called "quick action triple valve," with which the most improved brake systems are now equipped, is so constructed that when an extremely sudden reduction is made in the train-pipe, of say ten or twelve pounds or more, in addition to opening the brake cylinder to the auxiliary reservoir, as hitherto noted, it will open the same to the train pipe direct, giving what is called "the emergency action." Under this emergency action, the joint pressures of the train pipe and reservoir are delivered on to the brake motor piston, giving an effective pressure of sixty pounds on the piston from seventy pounds reservoir and train pipe pressure, or about twenty per cent. greater than from a service application. This emergency action is practically instantaneous and simultaneous throughout the entire train; and produces great strain on the car couplings and running gear. Hence, as its name indicates, it should be restricted to cases of emergency. The reductions in the train pipe, both for the service and the "emergency" applications, are controlled by a graduating discharge valve called the "engineer's brake-valve." This engineer's valve, is located intermediate the train pipe and main reservoir on the engine, and is provided with a hand lever, positioned in the cab within easy reach of the engineer. The engineer's brake valve also controls the release of the brakes; and, when moved into its releasing position, will admit air direct from the main reservoir to the train pipe, thus increasing the pressure in the train pipe. This increase of pressure in the train pipe, will through the instrumentalities of the triple valves, above referred to, reopen the passages from the train pipe to the auxiliary reservoirs permitting the same to be recharged, and, at the same time open the brake cylinder to exhaust, allowing the air in the same to escape into the atmosphere, thus releasing the brakes. In a word, the entire system is under the control of the engineer through his brake valve; and the several positions assumed by the said valve, for performing the several different required functions are known respectively as the "running" or normal position, the "lap," or closed position of all passages, "the service application positions," the "emergency position" and the "releasing position."

With the foregoing statements in mind, our invention may be readily understood.

Briefly stated, as one broad feature of our invention, we combine with the train pipe and valve mechanism for opening and closing the exhaust therefrom, a controller, for effecting the exhaust closing movement of said valve mechanism, comprising a chamber charged with fluid under pressure and closed during exhaust from train pipe, and a movable body, such as a piston, subject to the train pipe pressure on one side and to pressure from said chamber on the other, which movable body, under the reducing pressure in the train pipe will be compelled to move by the pressure from said closed chamber and may be made to effect the exhaust closing movement of said valve mechanism.

As another broad feature of our invention, we provide a valve mechanism having a pair of valves, one of which may, for convenience, be called the "exhaust opening valve," and the other, the "cut-off valve," the former of which is adapted to open the train pipe to exhaust and may be variably set in advance, in different predetermined positions for corresponding reductions; and the latter of which, is under strain or tension and adapted to follow, under the reducing pressure in the train pipe, to automatically cut off the exhaust whenever the corresponding set reduction has been reached. In other words, our valve mechanism is adapted to be set, for any desired reduction, and the exact reduction necessarily follows without any further attention. No pressure gage is required.

In the preferred form of our invention, the exhaust opening valve has an exhaust port of constant size through its body, employed for all service applications of the brake, of such restricted cross section that the escape is limited, so that the reduction must be gradual.

Our mechanism is illustrated in the accompany drawings.

Figure 3:
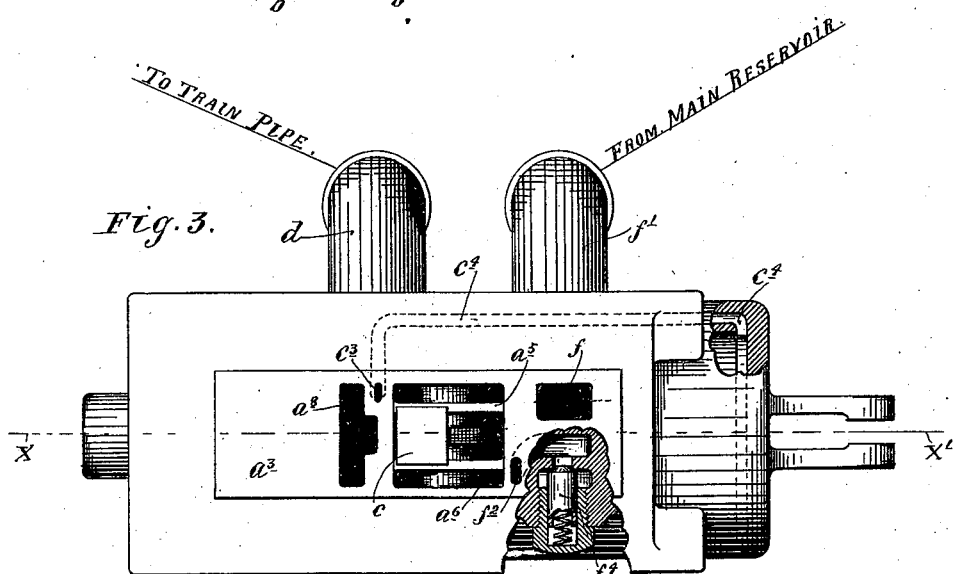
Figure 4:
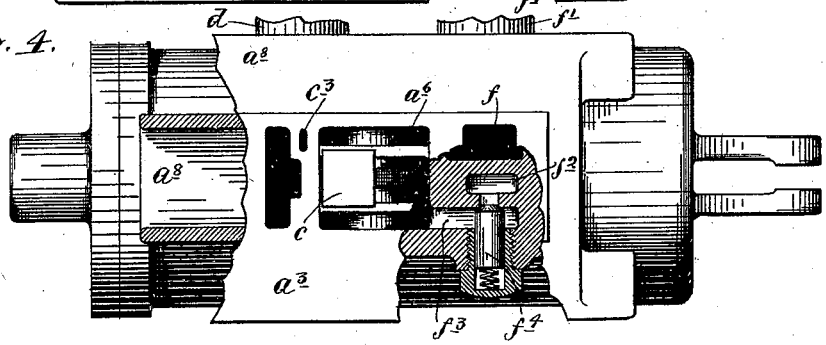
Figure 9:
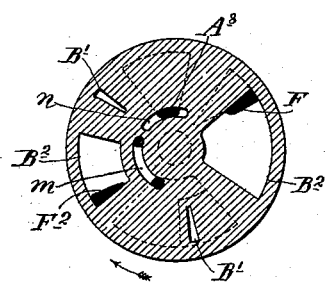
Figure 8:
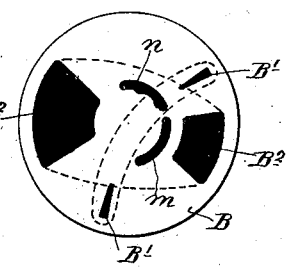
Figure 7:
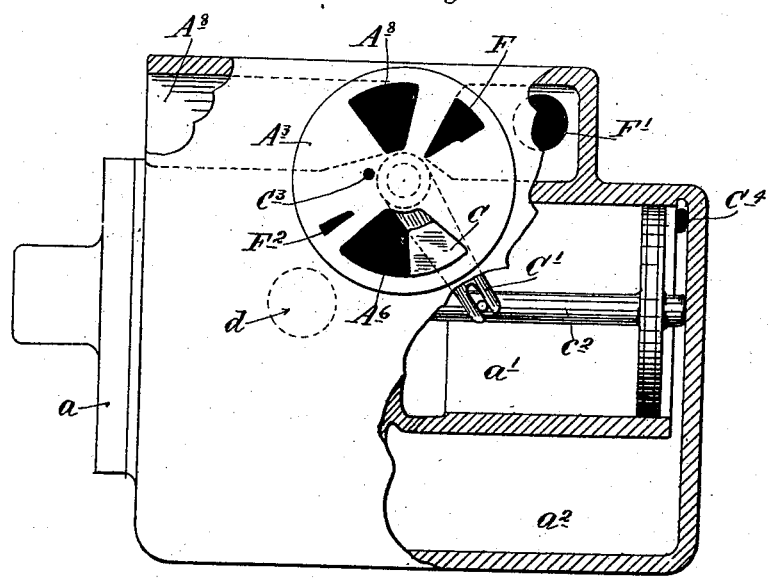
Figure 10:
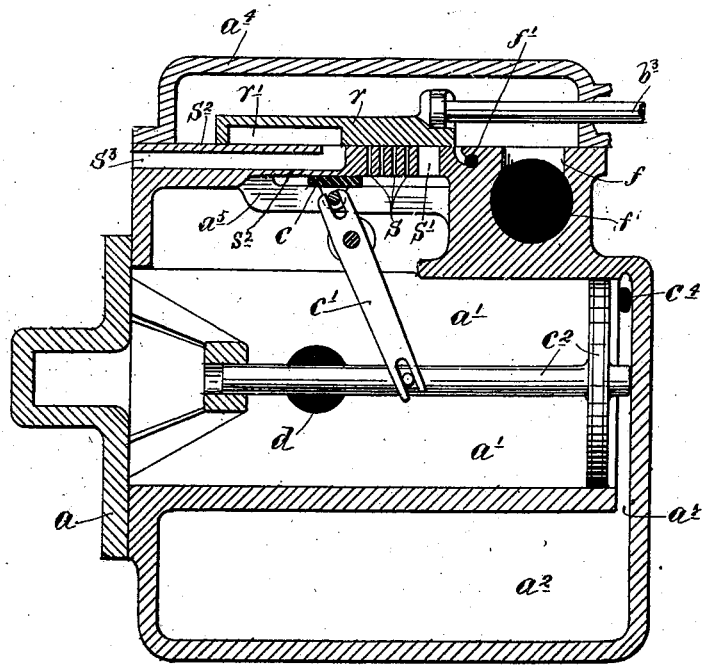

Figure 1 is a longitudinal vertical section, of the entire valve mechanism, constructed in accordance with the preferred form of our invention, taken on the section line X X' of Fig. 3. Fig. 2 is a vertical cross section taken on the line Y Y' of Fig. 1, looking toward the right. Figs. 3 and 4 are plan views of the valve mechanism, some parts being removed and others being broken away. Fig. 5 is a bottom view of the exhaust opening valve detached. Figs. $6^a$, $6^b$, $6^c$ and $6^d$ are a series of diagrammatic views, illustrating the different positions of the exhaust opening valve, on its seat, the engaging face of said valve being shown in skim sections. Fig. 7 is a diagrammatic view, partially in side elevation and partially in longitudinal vertical section, illustrating a modified form of the valve mechanism. Fig. 8 is a bottom view of the exhaust opening valve used in connection with the modification illustrated in Fig. 7, and Fig. 9 is a diagrammatic view of the same, illustrating the normal or running position of said valve on its seat. Fig. 10 is a view, in vertical longitudinal section, some parts being broken away, illustrating still another modification of the valve mechanism.

Referring to Figs. 1 to $6^d$ inclusive, $a$ is a main casting formed with a cylinder chamber $a'$, a closed storage or equilibrium chamber $a^2$ and a seat $a^3$ for the exhaust opening slide valve $b$. The said valve and valve-seat are covered, by an ordinary air chest $a^4$. $c$ is the cut off or follower slide valve supported by runways $a^5$, working against the face of the exhaust opening-valve $b$, and movable to and fro in the main port $a^6$ of the valve-seat $a^3$. The cut off valve $c$ is connected by a pivoted lever $c'$ with a piston $c^2$ working in the cylinder chamber $a'$. On the left side of the piston $c^2$ the cylinder $a'$ is in communication with the train pipe (not shown) through the union pipe section $d$; and, on the right side of said piston, the said cylinder $a'$ is in communication through a passage $a^7$ with the equilibrium chamber $a^2$. The air-chest $a^4$ is normally in communication with the main reservoir (not shown) through a port $f$, in the valve seat $a^3$, and through the union pipe section $f'$. $f^2$ is a feed-port from the valve-seat $a^3$ to a passage $f^3$, and fitted with the standard reduction or "excess pressure" valve $f^4$, which passage $f^3$ leads to the cylinder chamber $a'$ and thence, through pipe $d$, to the train pipe. $a^8$ is the exhaust passage from the valve seat $a^3$ to the atmosphere, normally closed by the valve $b$. $b'$ is the limited discharge or exhaust passage through the body of the valve $b$, which co-operates with the cut off valve $c$, in the service applications, and is normally closed by the valve-seat $a^3$. $b^2$ is a large exhaust passage in the valve $b$, which, by an extreme movement of the valve, may be made to open the main port $a^6$ to the external exhaust port $a^8$, for emergency use. In all other positions of the valve $b$, this passage $b^2$ is closed by the valve-seat $a^3$. $c^3$ is a port in the valve-seat $a^3$ communicating, through a passage $c^4$, with the cylinder $a'$ on the right side of the piston $c^2$. The valve $b$ has a stem $b^3$ passing out through a stuffing box $b^4$ to a hand-lever $b^5$, having a spring-latch $b^6$ engagable with a graduated notched segment $b^7$, the notches of which correspond to the different positions which the valve $b$ may take.

As is obvious, in lieu of the equilibrium chamber, inclosing the volume of air against the valve controlling piston, in opposition to the train pipe pressure, a spring might be employed. The air chamber is, however, much preferable, inasmuch, as the said chamber will always be charged to a pressure equal to that in the train-pipe, regardless of any variation in the so called normal or maximum train-pipe pressure.

Operation: The exact relation of the valves $b$ and $c$, to the air passages above noted, will be developed in tracing the operation, which may be done by reference to Figs. 1 and $6^a$ to $6^d$ inclusive.

First. In the running or normal position, as shown in Fig. $6^a$, the port $f^2$ is open to the port $f$, thus admitting air from main reservoir to feed, through the reduction valve $f^4$, to the train pipe, for charging the auxiliary reservoirs (not shown) and the cylinder chamber $a'$; and the port $c^3$ is open to the main port $a^6$, permitting the air to flow from the left end of the cylinder $a'$, through passage $c^4$, to the right end of said cylinder and thence through passage $a^7$ to the equilibrium chamber $a^2$, giving equal pressures on both sides of the piston $c^2$, which will normally stand as shown in Fig. 1.

Second. In lap position, as shown in Fig. 1, all the air passages are closed or blanked with the exception of the port $f$, which admits main reservoir pressure to the air chest $a^4$. This is the position into which the valve is thrown for "double heading," for making repairs without losing main reservoir pressure, &c.

Third. In any of the service application positions, as shown in Fig. $6^b$, the valve passage $b'$ will open the exhaust from the train pipe, through the main port $a^6$, to the external exhaust $a^8$. The port $f^2$ will be covered and all communication between the train pipe and main reservoir will be shut off thereby; and at the same time, the port $c^3$ is also covered, shutting off the equilibrium chamber $a^2$ from the train pipe, and rendering it a closed chamber, which is, at this time, charged with train pipe pressure. Hence, as the reduction takes place in the train pipe and cylinder chamber $a'$, the pressure of the air confined in the equilibrium chamber $a^2$ will force the piston $c^2$ toward the left, to preserve the equilibrium on its opposite sides. The piston $c^2$, in its movement toward the left, will through the lever $c'$, move the cut off or follower valve $c$ toward the right. Hence, if the notched segment $b^7$ had been properly graduated with relation to the movement of the piston $c^2$, for definite predetermined reductions in the train pipe; then, the very instant that the reduction is reached, for which the valve lever $b^5$ was set on the segment $b^7$, the cut off valve $c$ will have been moved so as to close the valve discharge passage $b'$ and cut off the exhaust. It is obvious, that the farther the valve $b$ is moved toward the right, in advance of the follower or cut off valve $c$, the greater will be the movement of the piston $c^2$, toward the left, and of the follower or cut off valve $c$ toward the right; and the greater the consequent reduction in the train pipe pressure. From the foregoing, it is obvious that all the engineer has to do, in service applications, is to set the lever $b^5$ in the proper notch of the segment $b^7$, provided for the predetermined desired reduction, or effective power on the brakes. The range of reductions for service applications, is from about eight to twenty pounds. Within this range, in virtue of the limited discharge passage $b'$ in the valve $b$, the reduction in the train pipe will be at the same rate, regardless of the total amount of reduction, and hence, under service applications, the emergency can never be unintentionally set; and, of course, owing to the action of the cut off or follower valve $c$, the train pipe cannot be bled, in any service application.

Fourth. In the emergency position, as shown in Fig. $6^c$, the valve $b$ and valve-lever $b^5$, are given their extreme throw toward the right, and the emergency exhaust passage $b^2$ of the valve $b$, will open the main port $a^6$ directly to the external exhaust $a^8$, giving the instantaneous discharge from the train pipe and causing the emergency action of the brakes. In the emergency position of the valve $b$, all other passages, except those above named, are closed. To insure the free exhaust necessary for the emergency action, regardless of the following movement of the cut off valve $c$, the said cut off valve $c$ is narrower than the emergency exhaust passage $b^2$ and the main port $a^6$, and hence will not close the same under its following movement.

Fifth. In the releasing position, as shown in Fig. $6^d$, the valve lever $b^5$ and the valve $b$, are moved to the extreme left. In this position, the main reservoir is thrown into direct communication with the train pipe, through the opened main port $a^6$, air chest $a^4$ and port $f$; thereby recharging the train pipe and auxiliary reservoirs and releasing the brakes. In this recharging of the train pipe and auxiliary reservoirs, the pressure in the main reservoir will be reduced below the maximum train pipe pressure of seventy pounds, but the pump will continue to act until the seventy pounds pressure is reached in the train pipe, when the pump will be stopped by the governor valve. In the releasing and recharging position of the valve $b$, as above noted, the passage $c^4$ from right end of cylinder $a'$ and equilibrium chamber $a^2$ will be open, through port $c^3$ and valve passage $b^2$ to the external exhaust $a^8$, thereby permitting the train pipe pressure in the cylinder $a'$ on the left side of the piston $c^2$ to return the same toward the right into its normal position.

In the modification shown in Figs. 7, 8 and 9, the principles therein involved are substantially the same as those set forth above, in connection with our preferred form of the valve mechanism. This modified construction is herewith shown simply to illustrate the fact that our valve mechanism may readily take the rotary form. In this modification, the modified parts corresponding to similar parts in the preferred form, are designated by the capital letters of the same characters marked with the same powers. In this construction, the port $C^3$ and passage $C^4$ leading to the equilibrium chamber $a^2$ are open to the train pipe in the "running position" and to the exhaust port $a^8$, in the "releasing position," by a pair of cavities $m$ and $n$, respectively. In the running position, (as shown) in Fig. 9, the cavity $m$ forms a communicating passage between the said port $C^3$ and the main port $A^6$ from the train pipe, while in the releasing position, not shown, the cavity $n$ opens communication, between the said port $C^3$ and the exhaust opening $A^8$. The cut off valve C is carried directly by the piston lever $C'$, pivoted at the axial center of the exhaust opening valve B. The operation of this valve mechanism as an entirety, is substantially the same as that of our preferred form, and a further description thereof is not deemed necessary.

Referring to the modification, illustrated in Fig. 10, this construction is herewith shown, to further illustrate the fact that the exhaust opening and exhaust closing valves and their co-operating exhaust passages in the valve seat, may take various forms, without departing from the broad principles of our invention. In this construction, the exhaust opening valve $r$ is provided with a large exhaust opening cavity $r'$, which co-operates with a series of exhaust port openings $s$ and $s'$ extending through the valve seat $s^2$, from the cylinder $a'$; and also with the external exhaust port $s^3$, opening from the said valve seat $s^2$ to the atmosphere. In service applications, the valve $r$ is moved so that the exhaust cavity $r'$ will uncover and form a communicating passage between one or more of the exhaust passages $s$, and the external exhaust port $s^3$; while, to apply the emergency action of the brakes, the said valve $r$ is given an extreme movement to the right, which causes its exhaust cavity $r'$ to open all of the ports $s$ and also the port $s'$, to the external exhaust $s^3$. In this construction, the cut-off valve $c$ works on the under side of the valve seat $s^2$, and is adapted to follow the primary or exhaust opening valve $r$, and cut off or close the particular exhaust openings $s$, which have been opened thereby, when the proper reduction has taken place in the train pipe. Otherwise, the construction and operation of this modification are the same as that set forth in the description of our preferred form.

As is obvious, various other alterations in the details of construction of our "engineer's brake-valve" might be made, without departing from the spirit of our invention. It will also be understood that the principles of our valve mechanism, as herein set forth, while shown and described as embodied in an "engineer's brake valve," may be readily incorporated into valve mechanism, suitable for general use, wherever it is desired to make graduated reductions of pressure in a fluid containing vessel.

What we claim, and desire to secure by Letters Patent of the United States, is as follows:

1. The combination with a train pipe or other receptacle containing fluid under pressure, of valve mechanism, for opening and closing the exhaust from the same, adapted to be set for the desired reduction, and a controller, for effecting the closing movement of said valve mechanism, comprising a chamber charged with fluid under pressure and closed during exhaust from said train pipe or other receptacle and a movable body subject to train pipe pressure on one side and to opposing pressure from said closed chamber on the other, whereby, under the reducing pressure in the train pipe, the said body will move and cut off the exhaust, whenever the set reduction is reached, substantially as described.

2. The combination with a train pipe or other receptacle, of a discharge port for the same, and a graduating discharge valve mechanism controlling said port and consisting of a primary or exhaust opening valve adapted to be set for a desired reduction of train pipe pressure, and a follower or cut-off valve co-operating with said primary valve and controlled by pressure from said train pipe or receptacle to automatically stop the discharge when the set reduction is reached substantially as described.

3. The combination with a train pipe or other receptacle, of a graduating discharge valve mechanism, comprising a primary or exhaust opening valve adapted to be set for the desired reduction, a follower or cut off valve, a controller, for said cut off valve, consisting of a chamber, charged with fluid under pressure and closed during exhaust from train pipe, and a movable body subject to train pipe pressure on one side and to pressure from said closed chamber on the other, and provided with connections to said cut off valve, whereby said body and cut off valve will move under the reducing pressure, and cut off the exhaust when the set reduction is reached.

4. The combination with the train pipe, of the primary or exhaust opening valve adapted to be variably set in advance for any desired reduction, the follower or cut off valve, the equilibrium chamber charged with train pipe pressure and closed during exhaust from train pipe, and the movable body, with connections to said cut off valve, subject to train pipe pressure on one side and to pressure from said equilibrium chamber on the other, substantially as and for the purposes set forth.

5. The combination with the train pipe, of the primary or exhaust opening valve adapted to be set in advance, for any desired reduction, the follower valve, the equilibrium chamber charged with air under pressure, a valved passage between said chamber and the air supplying receptacle, controllable by the movement of said primary valve and constructed to be opened in the "running position" and to be closed in the "service positions" of said primary valve, and a movable body connected to said cut off valve, subject to train pipe pressure on one side and to pressure from the confined air in the equilibrium chamber on the other, substantially as and for the purpose set forth.

6. The combination with the train pipe, or other air supplying receptacle, of valve mechanism, comprising the primary or exhaust opening valve adapted to be set in advance for any desired reduction, the follower or cut off valve, the equilibrium chamber, a fluid passage from said equilibrium chamber to the seat of said primary valve, the construction of said primary valve being such that said passage to the equilibrium chamber will be open to the train pipe in the "running position," closed in all "service positions," and opened to exhaust in the "releasing position," and the movable piston connected to said cut off valve, subject to train pipe pressure on one side and to the pressure from the equilibrium chamber, on the other, substantially as and for the purpose set forth.

7. The combination with the train pipe or other receptacle of valve mechanism, comprising the primary or exhaust opening valve provided with the restricted exhaust port, the cut off valve cooperating with said exhaust port in gradual reductions, the equilibrium chamber charged with air under pressure, and a movable body connected to said cut off valve, subject to train pipe pressure on one side, and to the pressure of the confined air in said equalizing chamber, substantially as described.

8. The combination with the train pipe of the valve mechanism, comprising the primary or exhaust opening valve provided with the restricted exhaust opening and the large emergency exhaust opening, the cut off valve cooperating with said restricted exhaust opening in the "service positions," and exhaust ports in the valve seat, cooperating with said emergency port in said primary valve, in the emergency application, the equilibrium chamber charged with air under pressure, and a movable piston connected to said cut off valve, subject to train pipe pressure on one side and to the pressure of the air confined in the equilibrium chamber on the other, substantially as and for the purpose set forth.

9. The combination with the primary or exhaust opening valve, adapted to be set in advance in different predetermined positions for corresponding reductions, of a graduated lock-plate marked to indicate the different positions of said exhaust valve, a manual valve setting device cooperating with said lock-plate, the cut-off valve, and the automatic controller for said cut off valve, substantially as and for the purpose set forth.

10. In a valve mechanism of the class described, the combination with the primary or exhaust opening valve $b$, having the restricted exhaust port $b'$, of the cut off valve $c$ working on the face of said valve $b$ and cooperating with the port $b'$, the casting $a$, comprising the cylinder $a'$ and the equilibrium chamber $a^2$, in communication with each other, and the piston $c^2$ working in said cylinder $a'$, subject to the train pipe pressure on one side and to the pressure of the air confined in the equilibrium chamber on the other, and having connections to said cut off valve $c$, substantially as and for the purpose set forth.

In testimony whereof we affix our signatures in presence of two witnesses.

HENRY H. VAUGHAN.
MARTIN E. McKEE.

Witnesses:
JAMES E. TRASK,
FRANK D. MERCHANT.